United States Patent [19]

Harvey, II

[11] 4,102,985

[45] Jul. 25, 1978

[54] ARC HEATER PRODUCTION OF SILICON INVOLVING A HYDROGEN REDUCTION

[75] Inventor: Francis J. Harvey, II, Murrysville, Pa.

[73] Assignee: Westinghouse Electric Corp., Pittsburgh, Pa.

[21] Appl. No.: 757,545

[22] Filed: Jan. 6, 1977

[51] Int. Cl.² .......................... C01B 33/02; C01B 7/08
[52] U.S. Cl. .................................. 423/350; 423/481; 204/164
[58] Field of Search ............... 423/350, 341, 342, 481; 204/164

[56] References Cited

U.S. PATENT DOCUMENTS

| 2,904,404 | 9/1959 | Ellis, Jr. .............................. 423/350 |
| 3,765,870 | 10/1973 | Fey et al. ............................ 75/10 R |

OTHER PUBLICATIONS

"Encyclopedia of Chem. Reactions", by C. A. Jacobson, vol. 6, 1956 Ed., p. 124, Reinhold Pub. Corp., N. Y.
"A Course in Gen. Chem.", by McPherson & Henderson, 3rd Ed., 1927, p. 233, Ginn & Co., N. Y.

Primary Examiner—Edward Stern
Attorney, Agent, or Firm—L. P. Johns

[57] ABSTRACT

A process for the production of high purity silicon characterized by the employment of an electric arc heater in which a silicon halide is reacted with hydrogen to produce liquid silicon and gaseous co-products.

6 Claims, 3 Drawing Figures

ARC HEATER PRODUCTION OF SILICON INVOLVING A HYDROGEN REDUCTION

CROSS-REFERENCE TO RELATED APPLICATIONS

This application is related to the applications Ser. No. 745,728, filed Nov. 26, 1976 by Maurice G. Fey; Ser. No. 745,726, filed Nov. 26, 1976 by Maurice G. Fey and Charles B. Wolf; and Ser. No. 757,546, filed Nov. 6, 1976 of Maurice G. Fey, Francis J. Harvey, and John McDonald.

BACKGROUND OF THE INVENTION

1. Field of the Invention

This invention relates to the production of high purity silicon and, more particularly, it pertains to the use of an electric arc heater for the production of silicon involving a hydrogen reduction.

2. Description of the Prior Art

Prior processes for the production of high purity silicon are generally characterized by high costs and low capacity. One method for producing high purity silicon involves the following steps: (1) carbothermic reduction of silica to metallurgical silicon, (2) conversion of the metallurgical silicon to an intermediate compound such as $SiHCl_3$, (3) purification of the intermediate compound, and (4) decomposition of the intermediate compound to silicon.

The silicon produced by this process is very costly and, thus, economically unsuitable for use in many applications and, in particular, in solar electric power generation devices.

SUMMARY OF THE INVENTION

The process of this invention is characterized by the following steps:

(1) halogenation of a silica-bearing material in the presence of carbon to produce gaseous silicon halide, impurity halides and the oxides of carbon;

(2) separation of the product gas stream of Step 1 to produce a high purity silicon halide, by fractional distillation or similar common process separation technique;

(3) arc heater reduction of the silicon halide by hydrogen to produce liquid silicon and gaseous hydrogen halides; and (4) electrolysis of the hydrogen halide to produce gaseous halide, which is returned to the halogenator, and the hydrogen, which is returned to the arc heater.

The arc heater reduction step, which is the novel part of this process, is carried out in a suitable reactor such that the liquid silicon and gaseous metal halides are easily separated. A reactor assembly which satisfies these requirements is a cyclonic device with a strong vortex flow which causes the liquid silicon to deposit on and run down the walls while the gaseous products exit through the top.

The particular advantages of this invention over the prior art are a low cost, and high capacity process for the production of high purity silicon. Such a superior method is required for the development of large scale solar-electric power generation. In addition, the reductant proposed in the present process is hydrogen, which is readily available and easy to handle.

DESCRIPTION OF THE PREFERRED EMBODIMENTS

In accordance with this invention the process is carried out as follows:

(a) providing an arc heater having spaced electrodes and forming an arc chamber communicating with a reaction chamber;

(b) striking an electric arc in an axial gap between the electrodes;

(c) introducing a gas selected from the group consisting of hydrogen an inert gas, silicon halides, and mixtures of these through the gap to provide an elongated arc stream extending into the reaction chamber;

(d) feeding into the arc stream an additional quantity of hydrogen;

(e) feeding into the arc stream a quantity of a halide, such as a tetrachloride or tetrabromide, or tetrafluoride or tetraiodide of silicon to produce liquid silicon and a gaseous salt;

(f) reacting the hydrogen and the silicon halide;

(g) projecting the reaction products into a cyclonic reaction chamber to cause the liquid silicon to separate centrifugally from the gaseous co-products; and (h) depositing the liquid silicon on the downwardly extending surface to permit the metal to flow into an associated receptacle.

Figure 1:
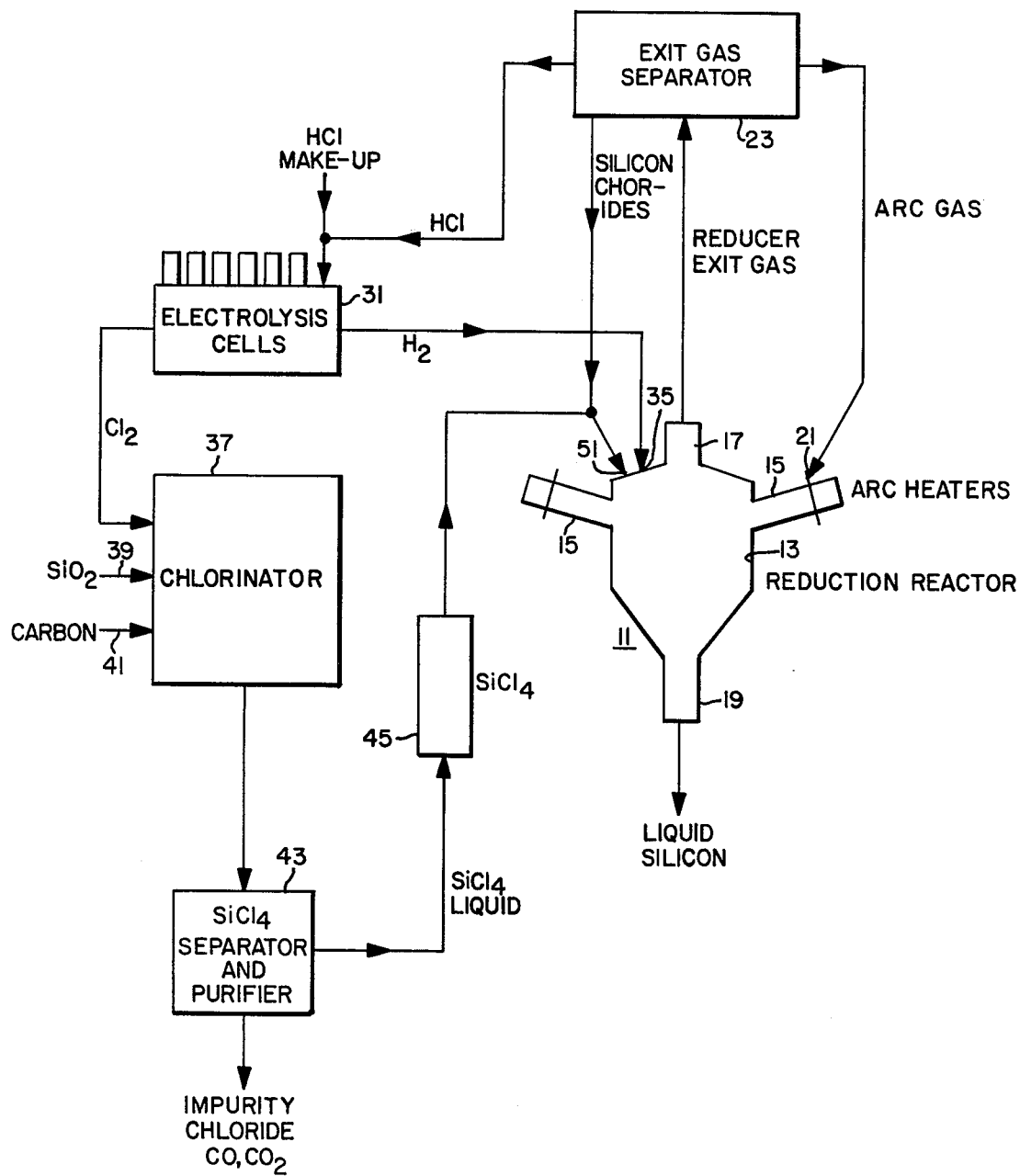
FIG. 1 is a flow diagram.

The process may be carried out in a cyclonic reactor generally indicated at 11 in the drawings. The reactor 11 is supported by associated structures as shown in FIG. 1. The reactor 11 comprises a reaction chamber 13, at least one and preferably a plurality of arc heaters 15, a first vent or outlet means 17 for co-product gases, and second vent or outlet means 19 for liquid silicon.

The arc gas is introduced into the system at 21 through the arc heaters 15 as will be set forth more particularly below. The arc gas together with the other co-products including HCl(g) leave the reactor through the outlet means 17 and are connected to a cyclone type separator 23 for separating the arc gas and the HCl, the former of which is redirected into the arc heaters at inlet 21. The HCl leaves the separator 23 from where it is conducted to an electrolysis cell 31 for disassociation into hydrogen and chlorine. The hydrogen is transmitted to inlet 35 where it is introduced into the reactor 11. The chlorine from cell 31 is conducted to a chlorinator 37 where, together with a silica bearing material is introduced at inlet 39 and a carbonaceous material such as coke, introduced at inlet 41 react with the chlorine to produce silicon tetrachloride impurity chlorides, and oxides of carbon. The mixture of gases that are produced in the chlorination proceed to the separator 43 where the silicon tetrachloride is purified. The silicon tetrachloride is moved to the vaporizer 45 and then to the reactor 11 at inlet 51.

Figure 2:
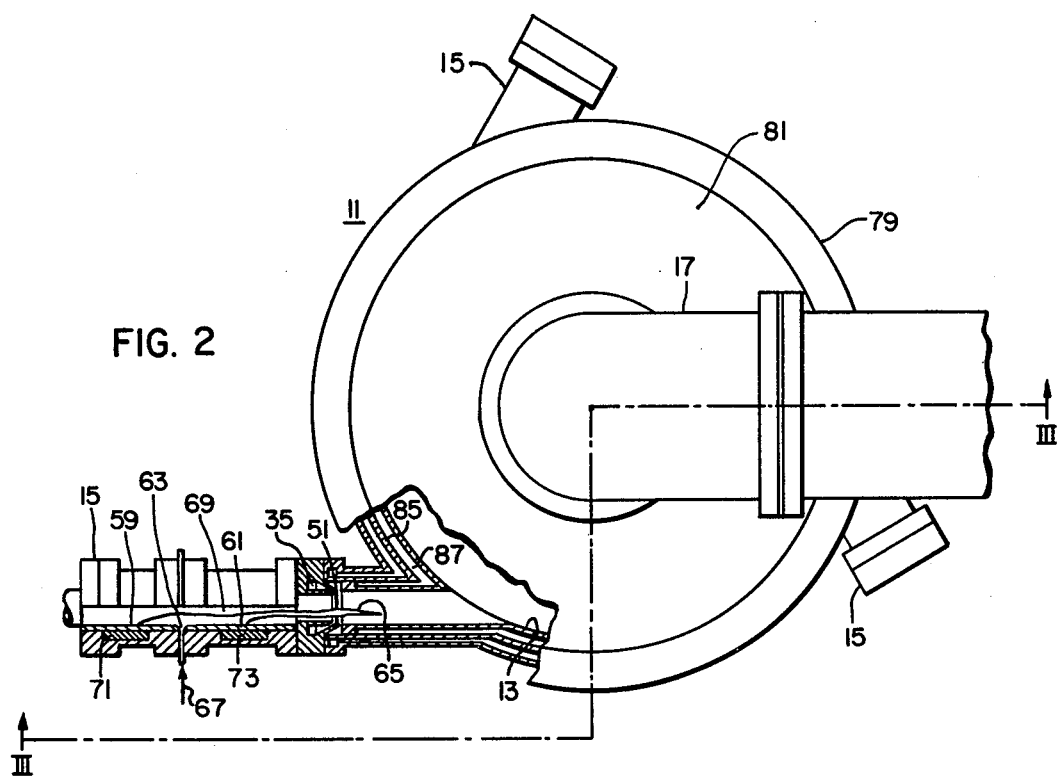
FIG. 2 is a plan view partly in section of the reactor having three arc heaters.

As shown in FIG. 2, one or more and preferably three arc heaters 15 are similar in construction and operation to that disclosed in U.S. Pat. No. 3,765,870, entitled "Method Of Direct Or Reduction Using A Short Gap Arc Heater" of which the inventors are M. G. Fey and George A. Kemeny. Because of the full disclosure in that patent, the description of the arc heaters 15 is limited herein to the basic structure and operation. The arc heaters 15 (FIG. 2) are each a single phase, self-stabilizing AC device capable of power levels up to about 35 kilowatts, or up to about 10,000 kilowatts for a three phase plant insulation. In the practice of this invention, it is preferred that three arc heaters be provided, one for each of the three phases of the AC power supply.

As shown in FIG. 2, the arc heater 15 has two annular copper electrodes 59, 61 which are spaced at 63 about one millimeter apart to accommodate a line frequency power source of about 4 kV. An arc 65 occurs in the space or gap 63 and incoming feed stock gas immediately blows the arc 65 from the space into the interior of the arc chamber 69. The feed stock gas 67 must be compatible with the silicon and may be one of the gases selected from the group consisting of inert gas, hydrogen, silicon halides and mixtures thereof. The arc 65 rotates at a speed of about 1000 revolutions per second by interaction of the arc current (several thousands amps AC) with a DC magnetic field set up by internally mounted field coils 71, 73. The velocities yield a very high operating efficiency for equipment of this type and the elongated arc 65 is ultimately projected by the gas downstream toward and possibly into the reaction chamber 13.

Feed stock material is introduced through inlet ports 35, 51, i.e., preferably downstream of the electrodes 61 so that the materials enter into the elongated arc 65.

The reacting materials are a silicon halide and hydrogen. In the case that the halide is silicon tetrachloride, the hydrogen reacts with the tetrachloride by the following reaction:

$$SiCl_4(g) + H_2(g) \rightarrow Si(l) + 4HCl(g)$$

The reaction is carried at a temperature such that the silicon is in the liquid state and the other co-products are in the gaseous, i.e., above the melting point of silicon (1685° K).

Figure 3:
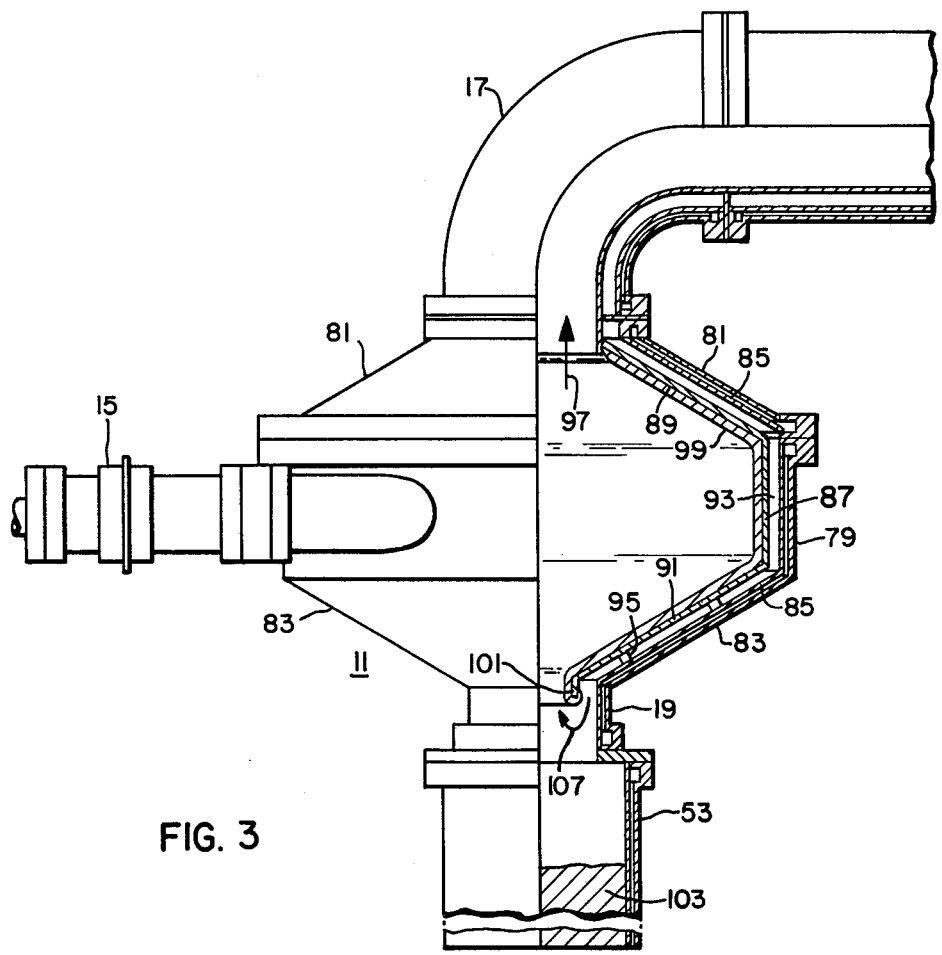
FIG. 3 is a vertical view taken on the line III—III of FIG. 2.

As shown in FIGS. 2 and 3, the arc heaters 15 are connected to the chamber 13 tangentially. The chamber 13 is preferably cylindrical (FIG. 3) to enhance centrifugal separation of the liquid silicon and gaseous co-products of the foregoing reactions, whereby the gaseous products such as the hydrogen chloride, leave the reactor 11 via the outlet means 17 and the liquid silicon exits through the outlet means 19.

The chamber 13 is contained between a peripheral wall 79 and opposite end walls 81, 83. The upper end wall 81 is preferably tapered upwardly from the peripheral wall 79 and joins the lower end of the outlet means 17 so that the co-product gases are more readily directed from the centrifugal zone within the chamber 13 towards the outlet means 17. Similarly, the lower end wall 83 is inclined downwardly, and as shown in FIG. 3, joins the outlet means 19 which communicates with the ingot mold or collection chamber 53 for the silicon formed during the reaction. The peripheral wall 79 and end walls 81, 83 are preferably cooled by water jacket means 85 of a conventional nature.

Moreover, in accordance with this invention, the chamber 13 comprises an inner wall or liner 87 which is substantially concentrically disposed and spaced from the peripheral wall 79 and the end walls 81, 83. The inner wall 87 preferably comprises upwardly and inwardly inclined upper wall portion 89 and a lower wall portion 91. A spacing 93 between the peripheral and end walls 79, 81, 83 and the inner walls 87, 89, 91 is maintained in a suitable manner such as by spaced ceramic support rings 95 (FIG. 3).

The inner wall means including the walls 87, 89, 91 are provided to operate at high wall temperatures where silicon is the product of the reaction within the chamber 13. As the liquid silicon separates centrifugally from the co-product gases which leaves the reaction chamber 13 through the outlet as indicated by the arrow 97, the liquid silicon deposits on the inner walls 87, 89, 91 to form a solidified silicon layer 99 having a thickness which is established by heat transfer which thickness is limited to less than two inches. In view of the high temperature involved within the chamber 13, the inner walls 87, 89, 91 are composed of high temperature materials such as tantalum, tungsten or silicides thereof. The inner walls 87, 89, 91 are cooled by radiation to the water cooled outer walls 79, 81, 83.

The following example is illustrius of the invention:

EXAMPLE

An example of the process is the hydrogen reduction of silicon tetrachloride. The reaction resulting in the formation of liquid silicon is $$SiCl_4(g) + 2H_2(g) \rightarrow Si(l) + 4HCl(g)$$

In addition to liquid silicon and other silicon chlorides, silicon hydrides and chlorosilanes may form as the result of reaction between silicon tetrachloride and hydrogen. The formation of these other species would result in a yield of liquid silicon of less than 100%. Calculation of the complex equilibria in the silicon-hydrogen-chlorine system have shown that in the temperature range between 1800° K and 2400° K the maximum yield occurs at 2200° K. In particular, these calculations have shown that at 2200° K and one atmosphere total pressure the minimum theoretical hydrogen requirement is approximately 940 SCF (Standard Cubic Feet) per pound of silicon and the minimum theoretical energy requirement is about 26 Kw-hr/lb Si for a feedstream containing 25 mols of hydrogen per mol of silicon tetrachloride.

Accordingly, the reactor of the present invention provides for a unique assembly of an arc heater and reaction chamber which permits separation of the product silicon from the co-products' gases. Such an assembly is suitable for either single phase or three phase operation and capable of continuous operation at high production rates.

What is claimed is:

1. A process for producing high purity silicon by reduction of a silicon halide comprising the steps of:
   (a) providing an arc heater having spaced electrodes and forming an arc chamber communicating with a reaction chamber,
   (b) striking an electric arc in an axial gap between the electrodes,
   (c) introducing an arc gas selected from the group consisting of hydrogen, an inert gas, silicon halides, and mixtures thereof through the gap to provide an elongated arc stream extending into the reaction chamber,
   (d) feeding into the arc stream a quantity of hydrogen,
   (e) feeding into the arc stream a quantity of the halide of silicon to produce reaction products including liquid silicon and hydrogen halides, (f) projecting the reaction products tangentially into a cyclonic reaction chamber to cause the liquid silicon to separate centrifugally from the gaseous co-products, and (g) depositing the liquid silicon on a downwardly extending surface to permit the liquid silicon to flow into an associated receptacle.

2. The process of claim 1 wherein three arc heaters are provided in peripherally spaced positions around the reaction chamber.

3. The process of claim 1 wherein the halide is silicon chloride in step (e).

4. The process of claim 1 wherein the halide is silicon bromide in step (e).

5. The process of claim 1 wherein the halide is silicon fluoride in step (e).

6. The process of claim 1 wherein the halide is silicon iodide in step (e).

* * * * *